United States Patent [19]

Chavez, Jr.

[11] Patent Number: 6,052,449
[45] Date of Patent: Apr. 18, 2000

[54] SYSTEM FOR CONTROLLING THE PROVISIONING OF LONG DISTANCE SERVICE FROM DIFFERENT NETWORK CARRIERS

[75] Inventor: David L. Chavez, Jr., Thornton, Colo.

[73] Assignee: Lucent Technologies Inc., Murray Hill, N.J.

[21] Appl. No.: 09/107,028

[22] Filed: Jun. 29, 1998

[51] Int. Cl.[7] ................................................. H04M 15/00
[52] U.S. Cl. ........................................... 379/114; 379/130
[58] Field of Search ..................................... 379/112, 114, 379/144, 128, 130, 131, 92.01; 455/405, 406

[56] References Cited

U.S. PATENT DOCUMENTS

| | | | |
|---|---|---|---|
| 3,769,463 | 10/1973 | Graham et al. | 179/7.1 TP |
| 4,264,956 | 4/1981 | Delaney | 364/467 |
| 4,751,728 | 6/1988 | Treat | 379/112 |
| 4,791,665 | 12/1988 | Bogart et al. | 379/207 |
| 4,813,065 | 3/1989 | Segala | 379/112 |
| 5,068,891 | 11/1991 | Marshall | 379/91 |
| 5,400,395 | 3/1995 | Berenato | 379/114 |
| 5,473,630 | 12/1995 | Penzias et al. | 375/114 |
| 5,515,425 | 5/1996 | Penzias et al. | 379/112 |
| 5,781,620 | 7/1998 | Montgomery et al. | 379/112 |
| 5,799,071 | 8/1998 | Azar et al. | 379/113 |
| 5,799,072 | 8/1998 | Vulcan et al. | 379/112 |
| 5,878,122 | 3/1999 | White et al. | 379/115 |
| 5,881,138 | 3/1999 | Kearns et al. | 379/114 |
| 5,915,214 | 6/1999 | Reece et al. | 379/112 |
| 5,920,613 | 7/1999 | Alcott et al. | 379/112 |
| 5,930,343 | 7/1999 | Vasquez | 379/112 |

*Primary Examiner*—Paul Loomis
*Assistant Examiner*—Rexford W Barnie
*Attorney, Agent, or Firm*—John C. Moran

[57] ABSTRACT

Allowing a separate system owned by a service provider to access telephone terminals of consumers to determine the calling patterns of each consumer, utilize service plan information of different network carriers, automatically change the network carriers used by an individual consumer to more closely match the calling patterns of the consumer and the plan incentives, and to store information in the telephone terminal so that calling information is provided to the individual consumer in accordance with the service plan of the selected network carrier. The information stored in the telephone terminal of the consumer causes that telephone terminal to alert the consumer to special times during which the consumer should make telephone calls. In addition, the telephone terminal will warn the consumer upon the consumer attempting to place a call if there is a more advantageous time to place the call within some predefined time period.

8 Claims, 8 Drawing Sheets

SYSTEM FOR CONTROLLING THE PROVISIONING OF LONG DISTANCE SERVICE FROM DIFFERENT NETWORK CARRIERS

TECHNICAL FIELD

This invention relates to accessing long distance network carriers and, in particular, to the selection of such long distance network carriers.

BACKGROUND OF THE INVENTION

Within the United States, there are a number of network access providers (also referred to as long distance carriers or network carriers). For the consumer market, each of these carriers offer different long distance service plans. In addition, these plans vary often weekly or monthly as each of the carriers tries to gain a greater market share of the consumer long distance market. Often the proposed service plans are tailored to fit only certain call habits of consumers. In addition, the introduction of a new plan often provides service at a lower price for some fixed period of time, for example a month. Not only do these service plans change on a continuous basis, but these service plans require careful reading and the use of these service plans requires careful attention to when calls are made in order to reduce the monthly charge under a particular service plan.

It is known in the prior art to have devices that monitor the amount of time spent on a given call and to estimate the cost of that call based on simple parameters. The problems that exist however for the average consumer is choosing service plans on an ongoing basis and determining when to place calls to obtain the maximum economic advantage under the chosen service plan.

SUMMARY OF THE INVENTION

The proceeding problems are solved and a technical advance is achieved by an apparatus and method that allows a separate system owned by a service provider to access telephone terminals of consumers to determine the calling patterns of each consumer, utilize service plan information of different network carriers, automatically change the network carriers used by an individual consumer to more closely match the calling patterns of the consumer and the plan incentives, and to store information in the telephone terminal so that calling information is provided to the individual consumer in accordance with the service plan of the selected network carrier. Advantageously, the information stored in the telephone terminal of the consumer causes that telephone terminal to alert the consumer to special times during which the consumer should make telephone calls. In addition, the telephone terminal will warn the consumer upon the consumer attempting to place a call if there is a more advantageous time to place the call within some predefined time period.

These and other features and advantages of the invention will become more apparent from the following description of an illustrative embodiment of the invention considered together with the drawing.

DETAILED DESCRIPTION

Figure 1:
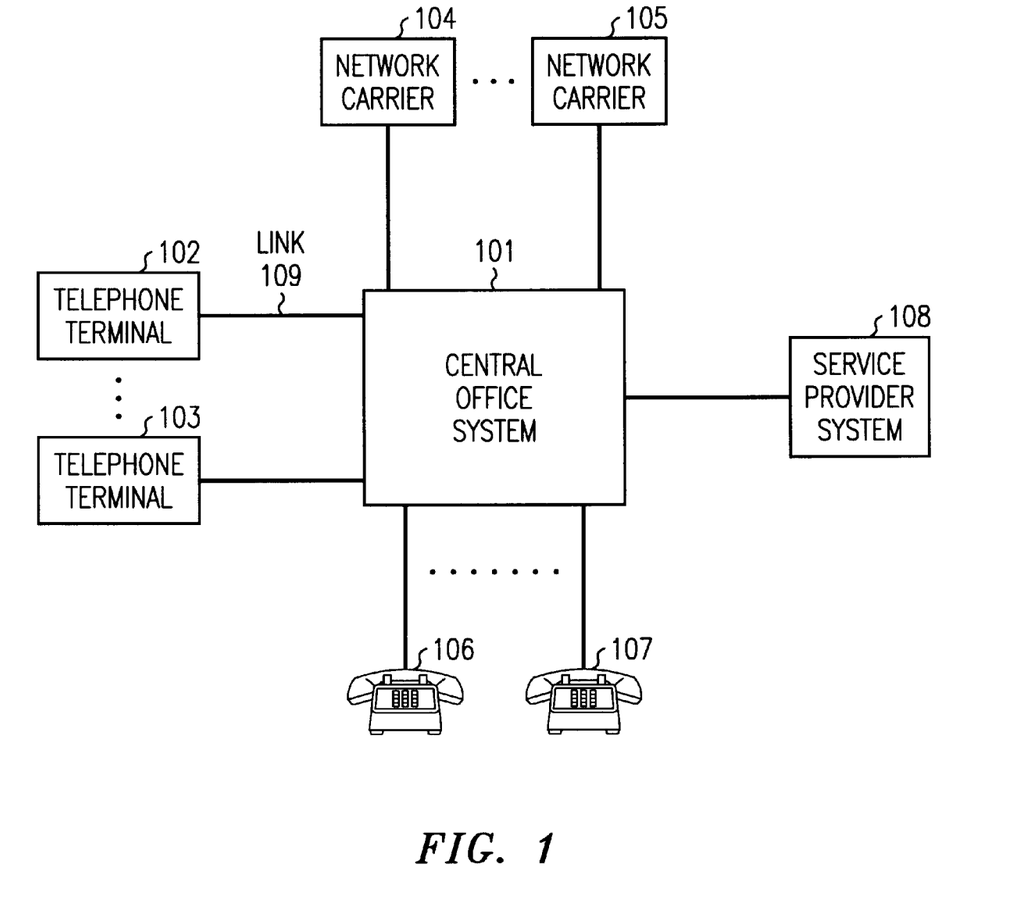
FIG. 1 illustrates a telecommunication system embodying the invention.

FIG. 1 illustrates a telecommunication system having central office 101 that interconnects telephone terminals 102 through 103 to each other and also to distant central offices via network carriers 104–105. Within the prior art, the user of each of the telephone terminals would have to individually contact one of the network carriers and request that the selected network carrier provide long distance network service for the user. The network carrier would then administratively inform the Regional Bell Operating Company (RBOC) controlling central office 101 of the user's choice, and central office 101 would store information specifying which long distance carrier the user had chosen. In addition to telephone terminals 102–103, ordinary telephones 106–107 are also interconnected to central office 101.

Service provider 108 provides a special service to telephone terminals 102–103. Telephone terminals 102–103 each have a computer which monitors and records the time and duration of telephone calls made. Service provider system 108 periodically transfers this stored information to itself. Based on service plan information that is received from network carriers 104–105, service provider system 108 determines if thenetwork carrier for each of telephone terminals 102–103 should be modified. If service provider system 108 determines that a network carrier for a particular telephone terminal should be modified, service provider system 108 contacts the new network carrier and requests that the new network carrier inform the RBOC that it is to be the new carrier so that the RBOC can modify the information stored in central office 101 which determines the network carrier for the particular telephone terminal. After the change has been made designating the new network carrier as the network carrier for a particular telephone terminal, service provider system 108 transfers information defining the new service plan to the telephone terminal so that the telephone terminal can guide the user in the utilization of the new service plan.

Utilizing the service plan information received from service provider system 108, the telephone terminal alerts the user to less expensive days for making long distance telephone calls at a predefined period before such a day occurs by flashing a message on the telephone terminal that can be read by the user. Advantageously, this predefined period is 24 hours. In addition, when the user attempts to place a telephone call during an expensive period, the telephone terminal displays a message advising the user of a time period that would be less expensive. During the course of a telephone call, telephone terminal calculates on an ongoing basis the cost of the telephone call and display this cost to the user. In addition, the telephone terminal maintains the total cost of long distance calls during a billing period. The user can access this billing information and have it displayed on the telephone terminal. Advantageously, when a new service plan has been selected and installed, the telephone terminal alerts the user to this fact, and the user can directly interrogate the telephone terminal to determine the cost of placing long distance telephone calls for various periods of time. In addition, when a user starts to dial a long distance call, the telephone terminal prompts the user for the expected duration of that call. Based on the service plan and the expected length of the call, the telephone terminal advises the user to call at a different time or the telephone terminal chooses a different network carrier. A different network carrier is selected by preceding the long distance call with a interexchange carrier code to select another carrier other than the one currently designated in the central office to serve this particular telephone terminal.

Figure 2:
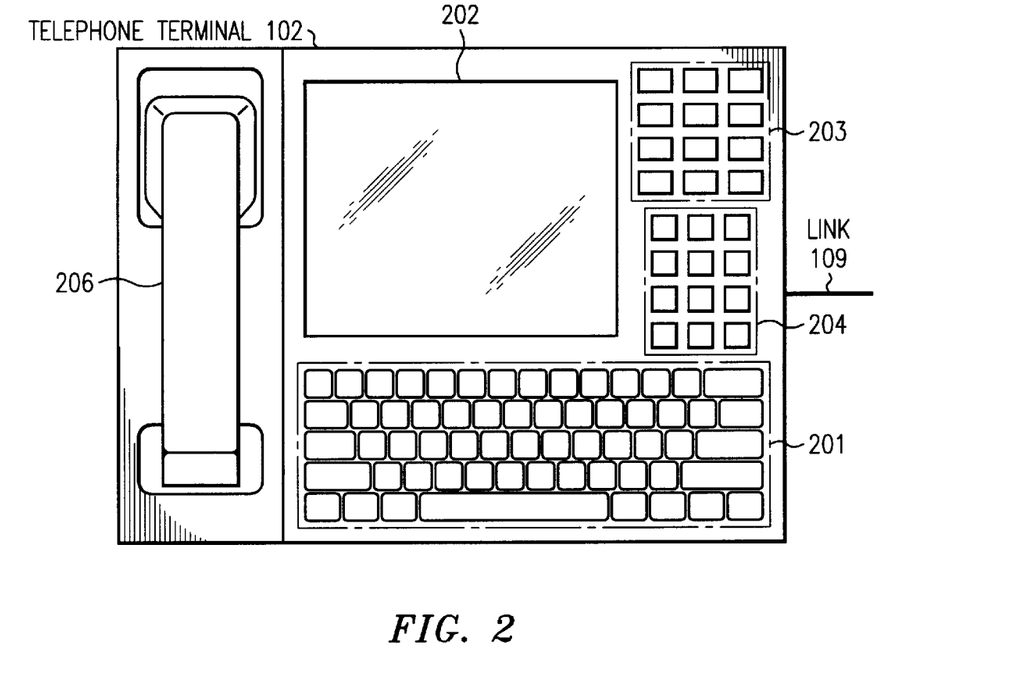
FIG. 2 illustrates a pictorial illustration of a telephone terminal.
Figure 3:
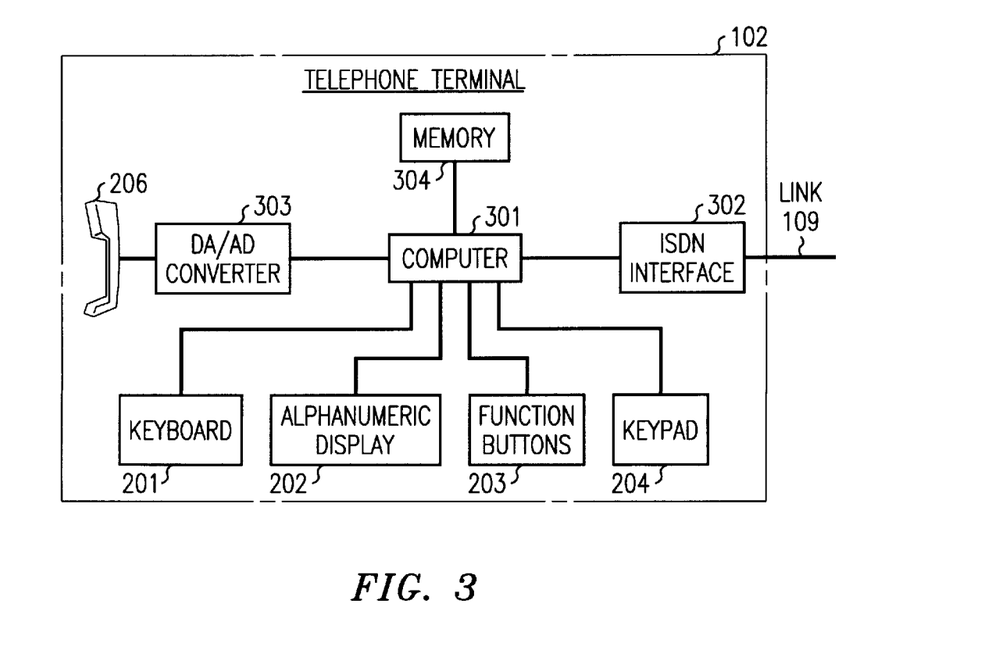
FIG. 3 illustrates in greater detail a block diagram of a telephone terminal.

FIG. 2 shows a pictorial view of telephone terminal 102. The other telephone terminals are identical in design. FIG. 3 shows a block diagram of telephone terminal 102. As can be seen in FIG. 2, alphanumeric display 202 is utilized to display textual messages to the user of the terminal. Alphanumeric display 202 is utilized to alert and explain to the user a new service plan and also to inform the user of alternate times for placing long distance calls. Keyboard 201 is utilized by the user to enter more information as requested by computer 301 of FIG. 3. Keypad 204 is configured as a normal telephone dialing keypad. Function buttons 203 are a series of buttons that allow the user to automatically select such functions as call last telephone number, abbreviating dialing, etc.

FIG. 3 illustrates a block diagram of telephone terminal 102. Link 109 is assumed for the sake of simplicity to be a BRI ISDN link. One skilled in the art, could readily envision that a analog telephone link could be utilized with a modem to receive and transmit digital data. ISDN interface 302 is responsive to data on link 109 to transfer both control messages, data messages, and voice to computer 301. Computer 301 is responsive to encoded voice from ISDN interface 302 to transmit this information to handset 206 via converter 303 which is both a digital to analog converter and an analog to digital converter. Analog voice information received from handset 206 by converter 303 is digitized and transferred through computer 301 to ISDN interface 302. Computer 302 utilizes memory 304 to store both data and program instructions. Elements 201–202 are interfaced to computer 301 utilizing well known techniques. Computer 301 includes a real time clock.

Computer 301 is responsive to the generation of calls via function buttons 203, keyboard 201, or keypad 204 to transmit the proper ISDN setup messages via link 109. In addition, computer 301 monitors for long distance calls being generated and will request the estimated duration of the long distance calls in order to determine the least cost using the current service plan or choosing an alternate network carrier if the alternate network carrier is cheaper.

Figure 4:
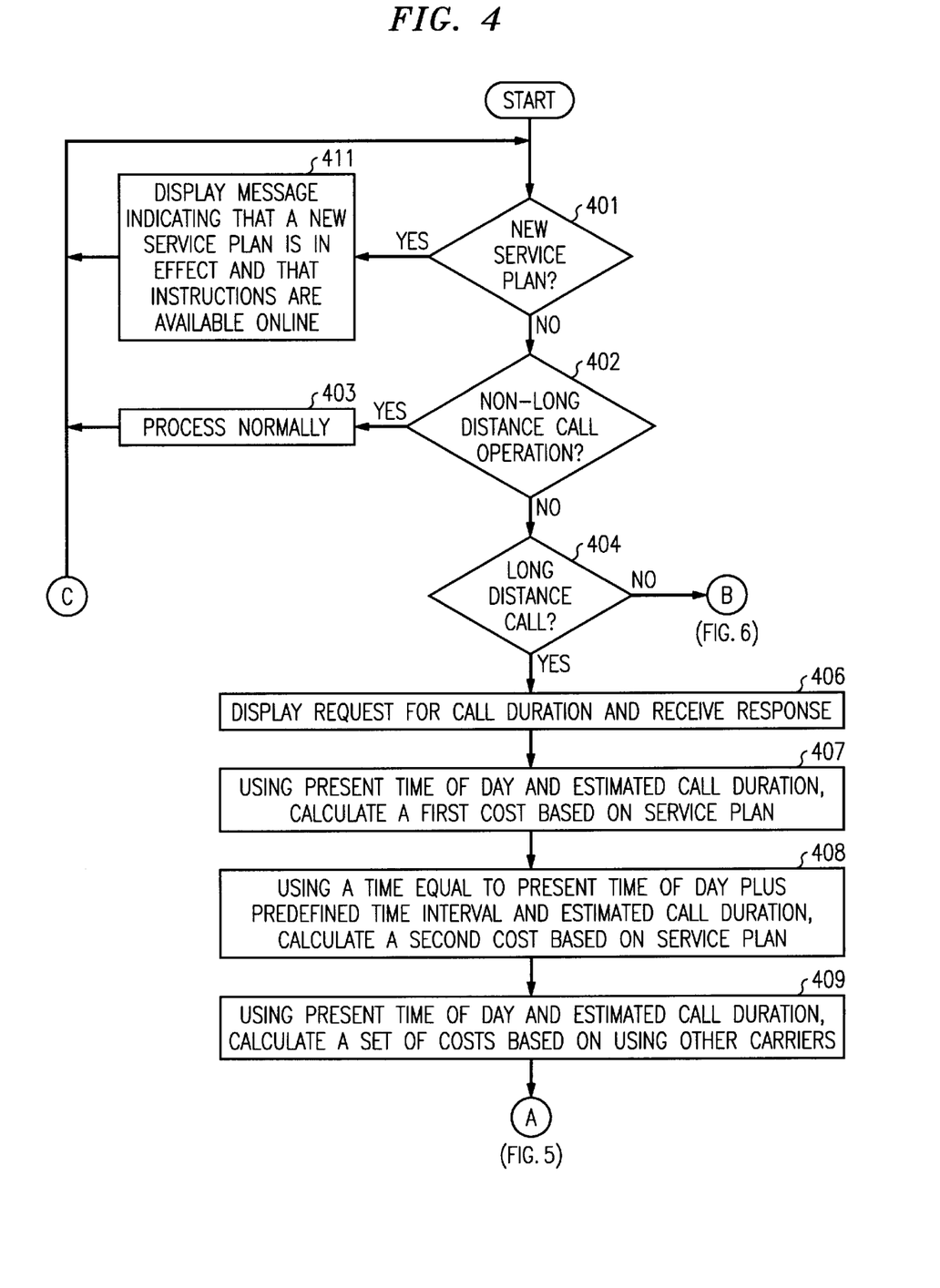
FIGS. 4–6 illustrate, in flow chart form, the steps performed by a computer of a telephone terminal.
Figure 5:
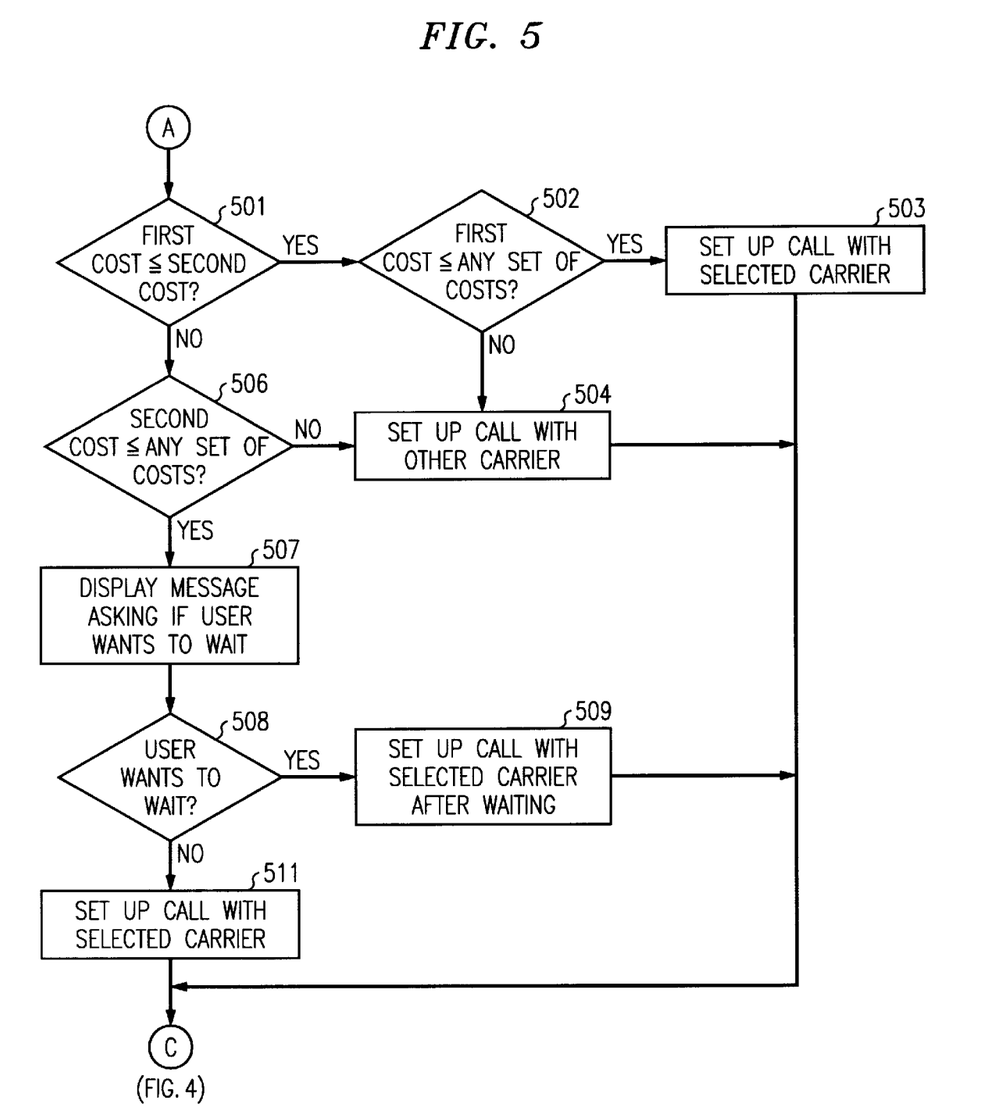
Figure 6:
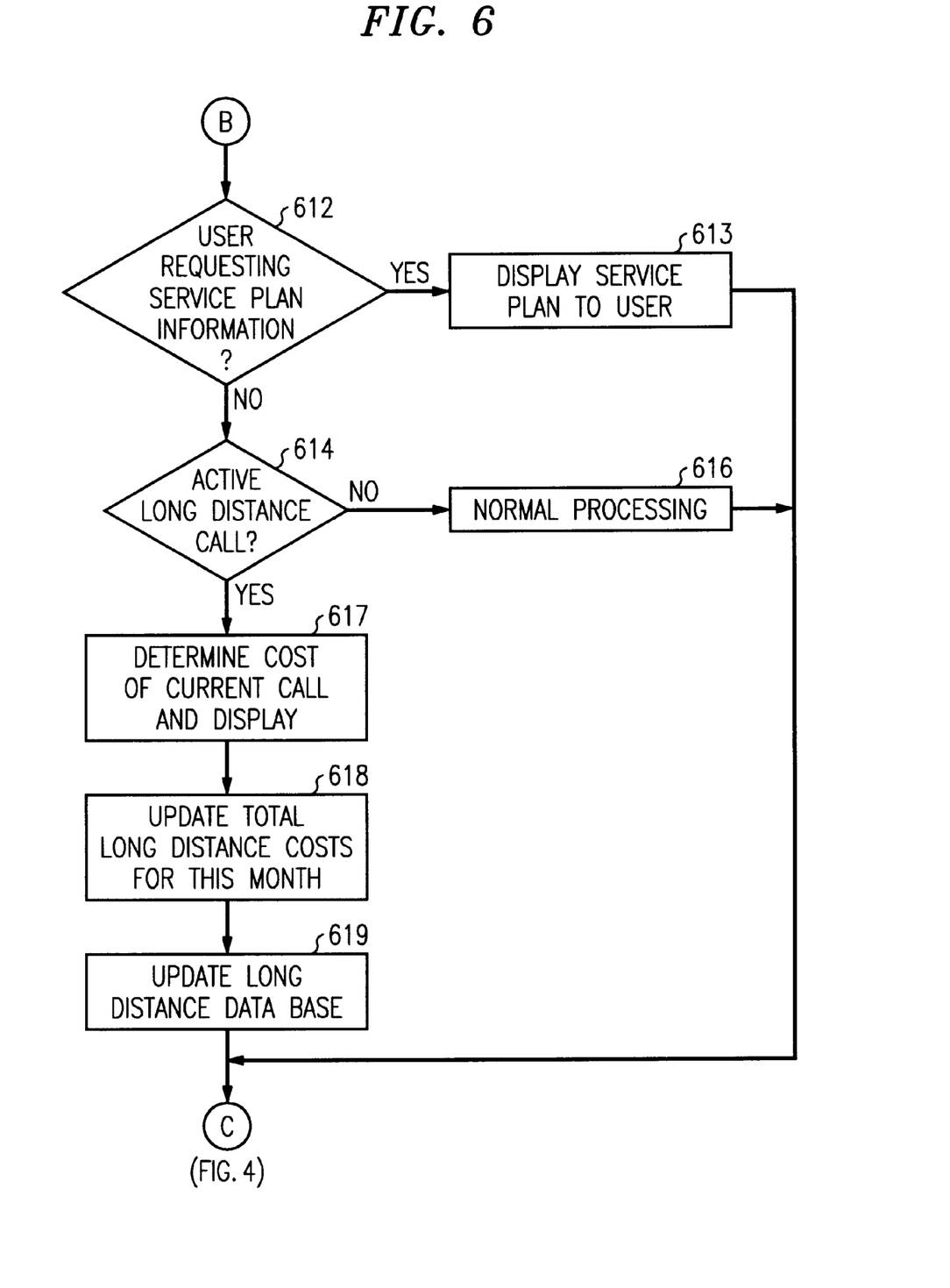

FIGS. 4–6 illustrate the steps performed by computer 301 of telephone terminal 102 in implementing the invention. Decision block 401 determines if a new service plan has been downloaded from service provider system 108 via link 109. If the answer is no, decision block 402 determines if a non-long distance call operation is being requested by the user of telephone terminal 102. Such an operation would be a local telephone call, administering one of the function buttons, etc. If the answer is yes in decision block 402, control is processed to block 403 which performs normal processing of the request before returning control back to decision block 401.

If the answer is no in decision block 402, decision block 404 determines if the user is attempting to place a long distance call. If the answer is yes, block 406 displays a message on alphanumeric display 202 requesting that the user enter an estimated duration of the call. Block 406 then receives the user's response designating the estimated call duration. Block 407 calculates using the present time of day and the estimated call duration the cost of placing such a call utilizing the present service plan of the designated network carrier. Next, block 408 adds a predefined time interval to the present time of day and utilizing the resulting time and the estimated call duration calculates a second cost based on the service plan. The predefined time interval is the maximum time that the user will be asked to wait if a cheaper rate can be obtained under the service plan by waiting a time less than or equal to this predefined time interval. After execution of block 408, block 409 uses the present time of day and the estimated call duration and calculates a set of costs for each of the other network carriers available through central office 101. This is done to determine if a non-designated carrier has a cheaper rate than the designated carrier. After execution of block 409, control is transferred to decision block 501 of FIG. 5.

Decision block 501 compares the first calculated cost with the second calculated cost. If the first cost is less than or equal to the second cost, control is transferred to decision block 502 which compares the first calculated cost with each of the costs determined for the other network carriers. If the first calculated cost is less than or equal to any of these costs, a call setup operation is performed by execution of block 503 by computer 301 utilizing ISDN interface 302 to set up the call via central office system 101 using the selected carrier. After execution of block 503, control is transferred to decision block 401 of FIG. 4. If the result of decision block 502 is no, the call is set up using the other network carrier having the lowest cost by execution of block 504. After execution of block 504, control is transferred to decision block 401 of FIG. 4.

Returning to decision block 501, if the second calculated cost is less than the first calculated cost indicating that money could be saved by waiting the predefined time, control is transferred to block 506 which determines if the second calculated cost is less than each of the set of costs calculated for the other network carriers. If the answer is no, control is transferred to block 504 whose operation has been previously described. If the answer is yes in decision block 506, control is transferred to block 507 which displays a message asking is the user wants to wait the predefined amount of time before proceeding with the call. Decision block 508 waits for the user's response. If the user wishes to wait, block 509 sets up the call with the selected carrier after waiting the predefined amount of time before transferring control back to decision block 401 of FIG. 4. If the user does not wish to wait, block 511 sets up the call with the selected carrier before transferring control back to decision block 401 of FIG. 4. At this point, the user could always take the information into account and then abandon the call. If this occurs, block 511 will transfer control back to decision block 401 of FIG. 4 without setting up the call with the selected carrier.

Returning to decision block 401 of FIG. 4, if a new service plan has been received from service provider system 108, control is transferred to block 411. The later block displays a message on alphanumeric display 202 indicating that a new service plan is in effect. The message also informs the user of the operations that the user needs to perform with keyboard 201 to obtain these new instructions. After execution of block 411, control is transferred back to decision block 401.

Returning to decision block 404, if the answer is no indicating that no type of call operation is being performed, control is transferred to decision block 612 of FIG. 6. Decision block 612 determines if the user is requesting service plan information. The user may request this information either because of the message that was displayed by block 411 or merely because the user wishes to refresh their memory concerning the service plan. If the answer is yes in decision block 612, block 613 displays the service plan to the user. Block 613 provides the user the capability of searching through the service plan using well known search tools. After execution of block 613, control is transferred back to decision block 401 of FIG. 4. If the answer is no in decision block 612, decision block 614 determines if there is an active long distance call. If the answer is no, block 616 performs normal processing before returning control back to decision block 401 of FIG. 4. If the answer in decision block 614 is yes, block 617 determines the cost of the current call and displays this cost on alphanumeric display 202 to the user before transferring control to block 618. The latter block updates the total long distance cost for the present month before transferring control to block 619. The latter block then updates the long distance database with information defining when the call was originally originated and its duration and the network carrier utilized. In addition, the total time of the call is also inserted into the database as well as when the user wished to place the call.

Figure 7:
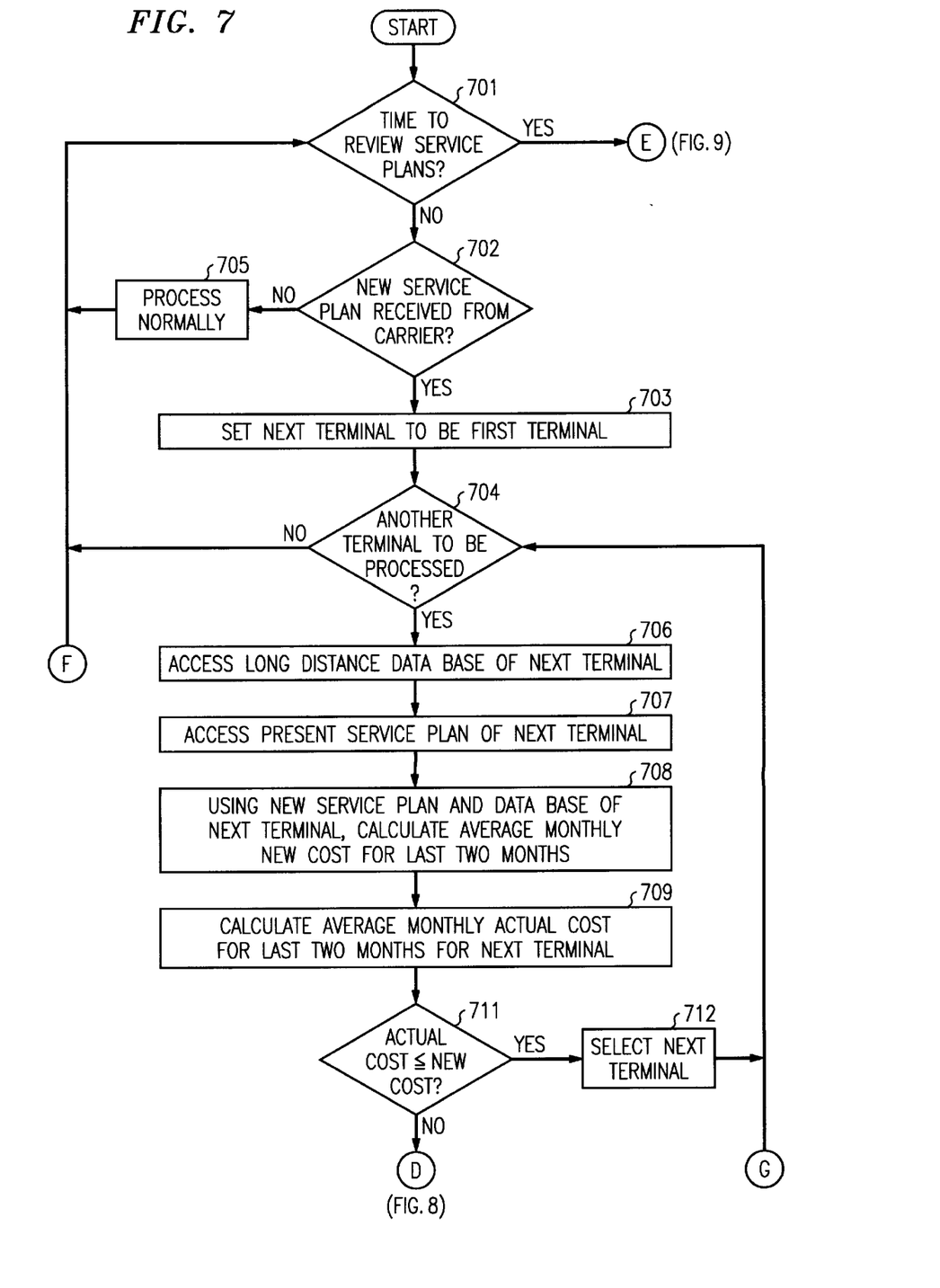
FIGS. 7–9 illustrates, in flow chart form, the steps performed by a service provider system.
Figure 8:
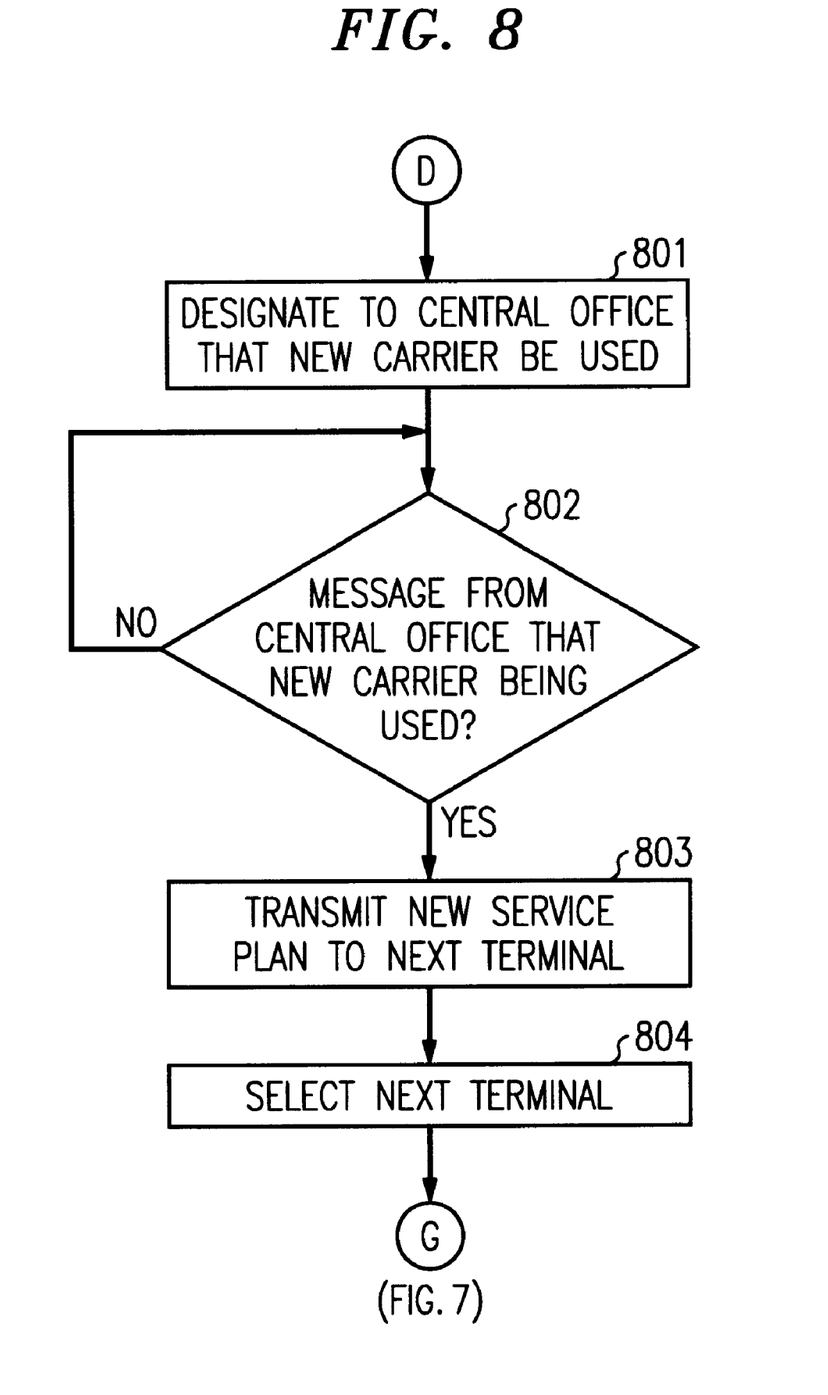
Figure 9:
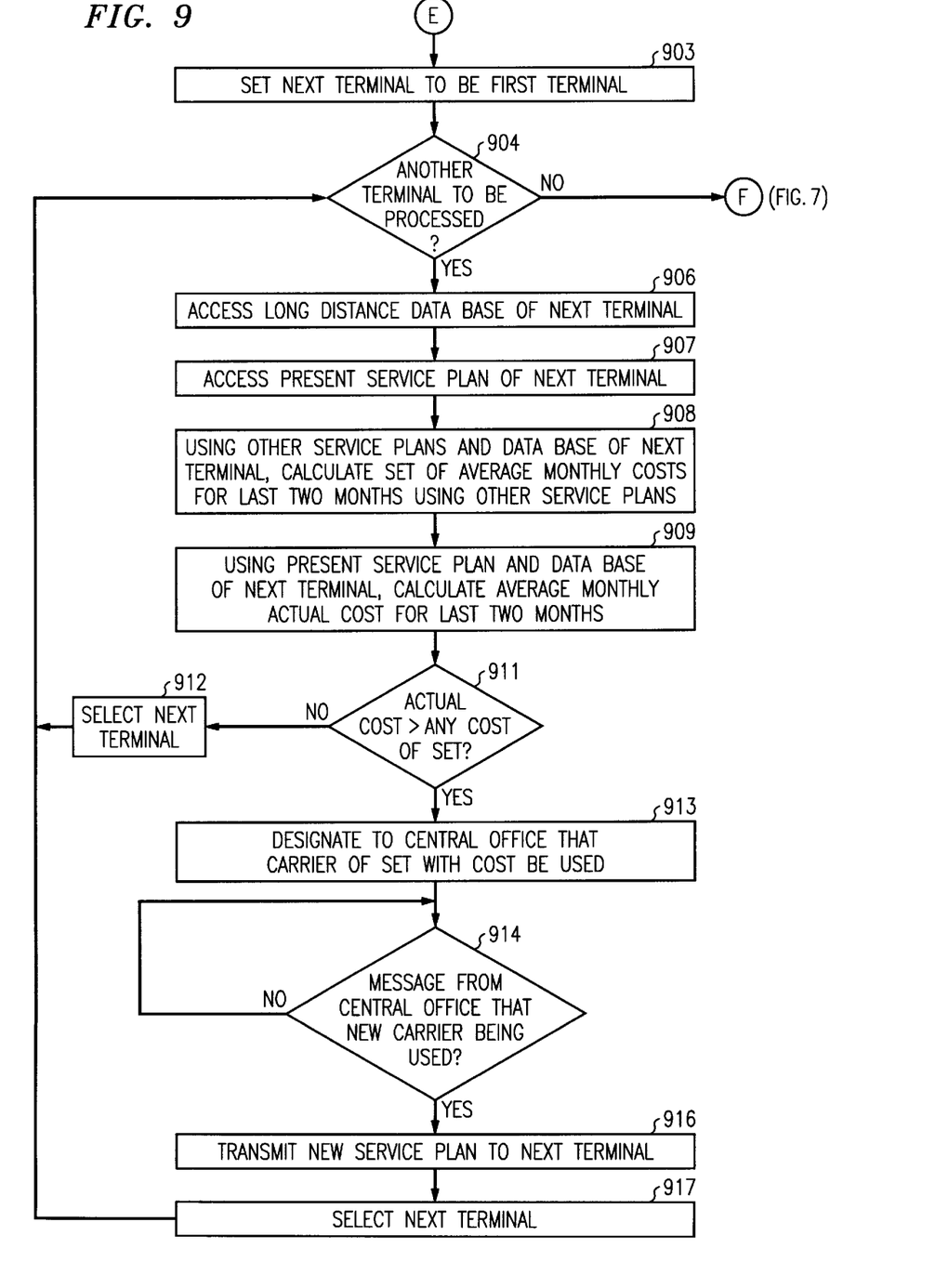

FIGS. 7–9 illustrate the steps performed by service provider system 108 in implementing the invention. Decision block 701 determines if it is time to review the service plans of the other network carriers in comparison to each telephone terminal's present service plan and the calling patterns of each telephone terminal. If the answer is no in decision block 701, decision block 702 determines if a new service plan has been received from any of the network carriers. One skilled in the art could readily recognize that this information could be received in paper form and entered manually into system provider system 108 or could be received via a data link from the network carriers. If the answer in decision block 702 is no, block 705 performs normal processing before returning control back to decision block 701. If the answer in decision block 702 is yes, block 703 sets the next terminal variable that is utilized by blocks 704–712 of FIG. 7 and blocks 801–803 of FIG. 8 equal to the first telephone terminal in the list of telephone terminals maintained by service provider system 108. Decision block 704 then determines if there is another telephone terminal in the list that has not yet been processed. Since the answer is yes for the first telephone terminal, control is transferred to block 706 which accesses the long distance database of the telephone terminal via central office system 101 and the appropriate link to the telephone terminal. Block 707 then accesses the present service plan of the telephone terminal, and block 708 calculates the average monthly cost (referred to as the new cost) over the last two months based on the new service plan and the data received from the database of the telephone terminal. Block 709 calculates the actual cost incurred by the telephone terminal for the last two months utilizing the data in the access database. Decision block 711 then determines if the actual cost is less than the new cost calculated in block 708. If the answer is yes, block 712 selects the next terminal in the list maintained by service provider system 108 and transfers control back to decision block 704.

If the answer in decision block 711 is no indicating that the actual cost is greater than the cost calculated under a new service plan, control is transferred to block 801 of FIG. 8 which sends a message to the RBOC controlling central office system 101 designating that the network carrier associated with the new service plan is to be the designated network carrier for the telephone terminal. One skilled in the art could readily see, that this information could be conveyed to the RBOC controlling central office system 101 either as verbal information, textual information, or as digital data via a data link. After execution of block 801, control is transferred to decision block 802. The latter decision block waits until a message is received from the RBOC controlling central office system 101 either digitally or via the interaction of a human before transferring control to block 803. Block 803 then transmits the new service plan to the telephone terminal and transfers control to block 804. The latter block selects the next terminal in the list maintained by service provider system 108 as the next terminal and transfers control back to decision block 704 of FIG. 7.

Returning to decision block 701 of FIG. 7, if decision block 701 indicates that it is time to review the service plans of the various network carriers, control is transferred to block 903 of FIG. 9. Block 903 sets the next terminal variable to the first terminal of the list maintained by service provider system 108 and transfers control to decision block 904. Decision block 904 determines if there is another terminal in the list to be processed. In the case of the first terminal on the list, the answer is yes, and control is transferred to block 906. If the answer is no in decision block 904, control is transferred back to decision block 701 of FIG. 7. Block 906 accesses the long distance database of the next telephone terminal, and block 907 accesses the present service plan of the next telephone terminal. Block 908 uses all of the other available service plans from the other network carriers and the database of the next terminal to calculate a set of average monthly costs for the last two months using these other service plans. Block 909 calculates the average monthly actual cost for the last two months of the telephone terminal utilizing the information in the database. Decision block 911 determines if the actual cost is greater than any of the costs of the other service plans. If the answer is no, block 912 selects the next terminal on the list and transfers control back to decision block 904. If the answer in decision block 911 is yes, block 913 designates to the RBOC controlling central office system 101 that the other network carrier with the lowest cost be used and transfers control to decision block 914. The latter decision block waits for a confirmation message that the new carrier is in use for the terminal before transferring control to block 916. Block 916 transmits the new service plan to the telephone terminal, and block 917 selects the next terminal from the list to be processed and transfers control back to decision block 904.

It is to be understood that the above-described embodiment is merely illustrative of the principles of the invention and that other arrangements may be devised by those skilled in the art without departing from the spirit or scope of the invention.

What is claimed is:

1. A method of selecting a network carrier for a plurality of telephone terminals, comprising the steps of:

receiving a new one of a plurality of service plans from one of a plurality network carriers;

accessing each of the plurality of telephone terminals to obtain a database defining calling patterns and telephone call costs for a predefined time for each of the plurality of telephone terminals;

calculating for each of the plurality of telephone terminals a difference in cost between actual call costs and projected call cost using the new one of the plurality of service plans based on accessed calling patterns;

determining for each of the plurality of telephone terminals if the difference indicates that the new one of the plurality of service plans cost less; and selecting the new one of the plurality of service plans for each one of the plurality of telephone terminals for which the new one of the plurality of service plans costs less.

2. The method of claim 1 wherein the step of selecting comprises the steps of designating the one of network carriers as the network carrier for each of ones of the plurality of telephone terminals for which the new one of the plurality of service plans costs less; and transmitting the new one of the plurality of service plans to each of the ones of the plurality of telephone terminals for which the new one of the plurality of service plans costs less.

3. The method of claim 2 further comprises the step of notifying a user of each of the ones of the plurality of telephone terminals for which the new one of the plurality of service plans costs less upon receipt of the new one of the plurality of service plans.

4. The method of claim 3 further comprises the step of providing the user access to the new one of the plurality of the service plans.

5. The method of claim 1 further comprises the steps of reassessing periodically each of the plurality of telephone terminals to obtain the database defining calling patterns and telephone call costs for the predefined time;

calculating for each of the plurality of telephone terminals differences in cost between actual call costs and projected call cost for each of existing ones of the plurality of service plans based on accessed calling patterns;

determining for each of the plurality of telephone terminals if one of the differences indicates that one of the present ones of the plurality of service plans cost less; and selecting the one of the present of ones of the plurality of service plans for each one of the plurality of telephone terminals for which the one of the present ones of the plurality of service plans costs less.

6. The method of claim 5 wherein the step of selecting comprises the steps of designating the one of network carriers as the network carrier for each of ones of the plurality of telephone terminals for which the one of the present ones of the plurality of service plans costs less; and transmitting the one of the present ones of the plurality of service plans to each of the ones of the plurality of telephone terminals for which the one of the present ones of the plurality of service plans costs less.

7. The method of claim 6 further comprises the step of notifying a user of each of the ones of the plurality of telephone terminals for which the one of the present ones of the plurality of service plans costs less upon receipt of the one of the present ones of the plurality of service plans.

8. The method of claim 7 further comprises the step of providing the user access to the one of the present ones of the plurality of the service plans.

* * * * *